United States Patent
Huang (10) Patent No.: US 8,228,387 B2
(45) Date of Patent: Jul. 24, 2012

(54) MINIATURIZED ANTI-VIBRATION IMAGE PICKUP DEVICE

(75) Inventor: Yaw-Ching Huang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 455 days.

(21) Appl. No.: 12/475,638

(22) Filed: Jun. 1, 2009

(65) Prior Publication Data

US 2010/0073495 A1 Mar. 25, 2010

(30) Foreign Application Priority Data

Sep. 23, 2008 (TW) ................................ 97136445 A (51) Int. Cl.
*H04N 5/228* (2006.01)
*G03B 17/00* (2006.01)
(52) U.S. Cl. ...................................... 348/208.11; 396/55
(58) Field of Classification Search .................. None
See application file for complete search history.

(56) References Cited

U.S. PATENT DOCUMENTS

| 6,064,827 | A  | * | 5/2000 | Toyoda | 396/55 |
| 7,688,354 | B2 | * | 3/2010 | Nomura et al. | 348/208.7 |
| 7,710,460 | B2 | * | 5/2010 | Stavely | 348/208.99 |
| 7,881,597 | B2 | * | 2/2011 | Tsutsumi et al. | 396/55 |

* cited by examiner

*Primary Examiner* — Luong T Nguyen
(74) *Attorney, Agent, or Firm* — Thomas|Kayden (57) ABSTRACT

A miniaturized anti-vibration image pickup device is provided, including a fixing base, a moving plane disposed on the fixing base that moves along a first direction and a second direction opposite to the fixing base, an image pickup member disposed on the moving plane, and a driving member. The driving member includes a first magnet and a second magnet disposed on the fixing base. A circuit board is disposed on the fixing base, wherein a first precision coil pattern and a second precision coil pattern are printed on the circuit board. The first precision coil pattern and the second precision coil pattern are formed by a electronic signal and move opposite to the first magnet and the second magnet disposed on the fixing base, so that the anti-vibration image pickup devices moved forward to restrain and compensate for blurred images. The coil on the circuit board designed by printed, reduces thickness of the whole device effectively.

6 Claims, 7 Drawing Sheets

MINIATURIZED ANTI-VIBRATION IMAGE PICKUP DEVICE

CROSS REFERENCE TO RELATED APPLICATIONS

This Application claims priority of Taiwan Patent Application No. 97136445, filed on Sep. 23, 2008, the entirety of which is incorporated by reference herein.

BACKGROUND OF THE INVENTION

1. Field of the Invention

The invention relates to a miniaturized anti-vibration image pickup device and more particularly to an image pickup device with a miniaturized Flexible Print Circuit (FPC) for anti-vibration.

2. Description of the Related Art

Conventional anti-vibration digital cameras usually use a sensor to detect motion of an image pickup device. And transfer electronic signal make the image pickup device at high speeds to move on a vertical optical axis plane which has two directions to restrain or compensate for vibrations that occur during a shooting processes to prevent blurred images.

Figure 1:
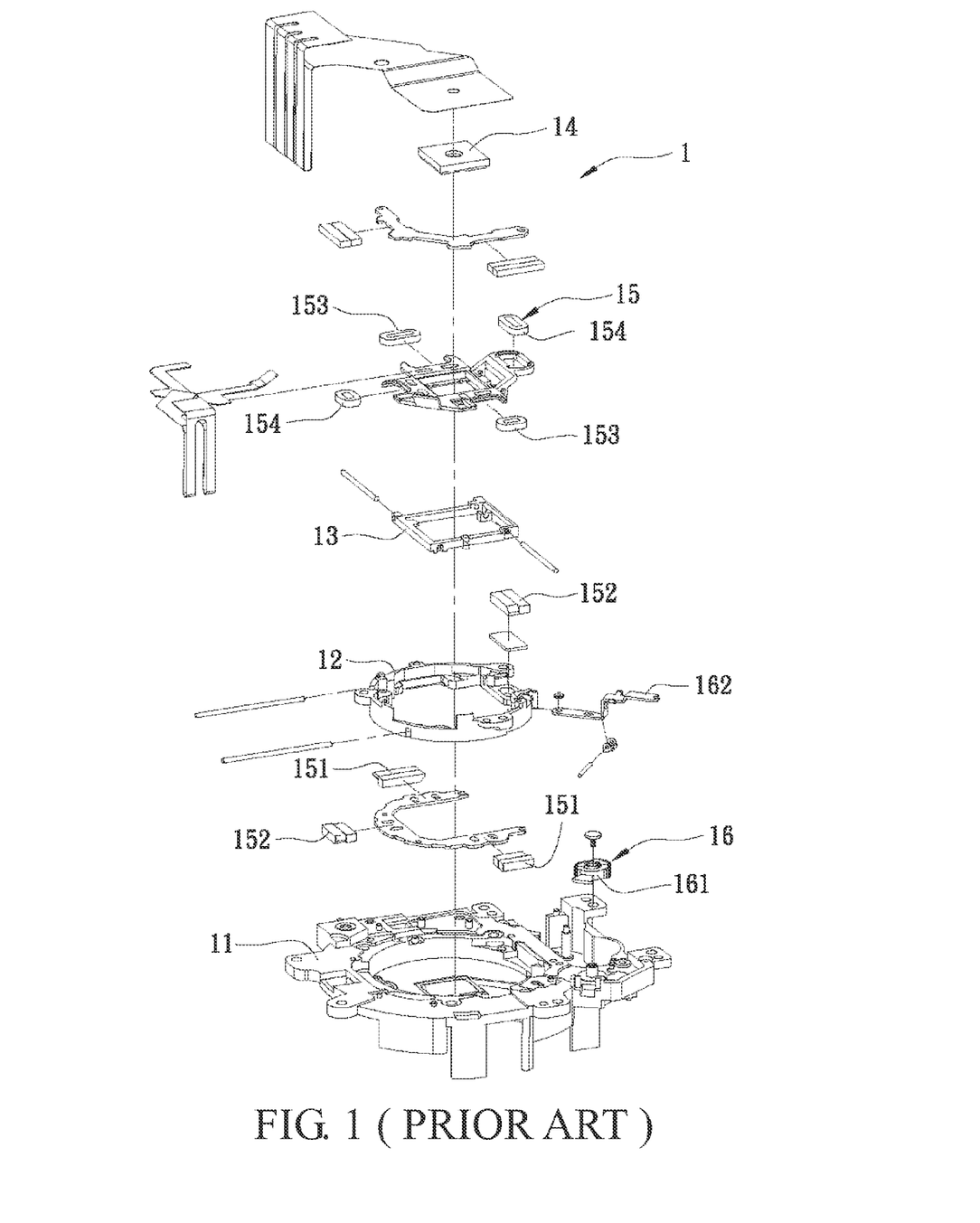
FIG. 1 is an exploded view of a conventional anti-vibration device.

Referring to FIG. 1, a conventional anti-vibration device 1 comprises a base 11 a horizontal moving plane 12 disposed in the base 11, moving along a horizontal direction and opposite to the base 11, a vertical moving plane 13 disposed on the horizontal moving plane 12, moving vertically opposite to the horizontal moving plane 12, an image pickup member 14 disposed on the vertical moving plane 13, and a driving unit 15.

The driving unit 15 comprises a pair of vertical magnets 151 and a pair of horizontal magnets 152 disposed in the base 11 and a pair of driving coils 153 and a pair of horizontal coils 154 disposed in the vertical moving plane 13.

The anti-vibration device 1 by adjusting the electronic signal input of the vertical driving coil 153 and horizontal driving coil 154, to change the position of the vertical moving plane 13 and the horizontal moving plane 12 opposite to the base 11, to retrain or compensate for blurred images.

Figure 2:
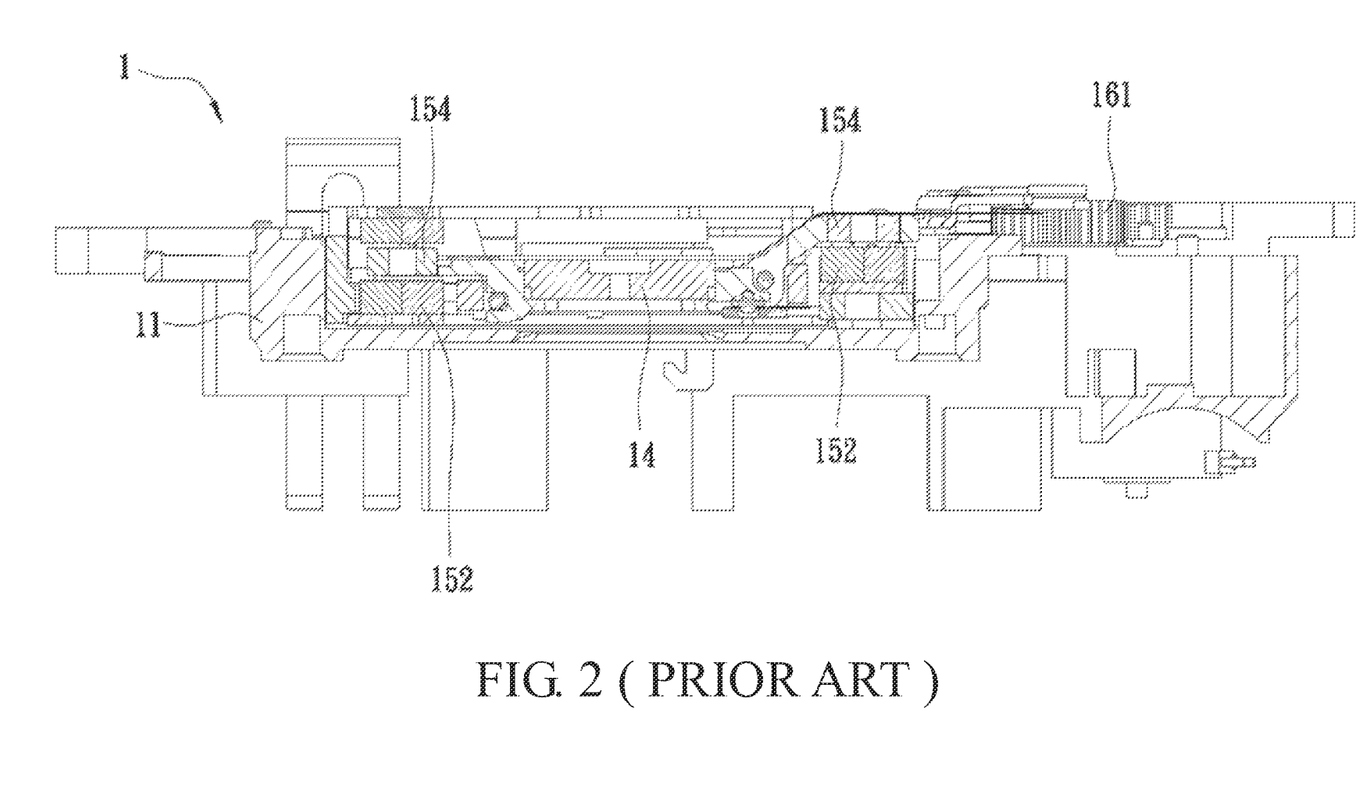
FIG. 2 is a lateral cross-sectional view showing thickness of a conventional coil.

Referring to FIG. 1 and FIG. 2, the vertical driving coil 153 and the horizontal driving coil 154 is made by copper filament as coil, thus hindering reduction of thickness of the vertical driving coil 153 and the horizontal driving coil 154.

Figure 3:
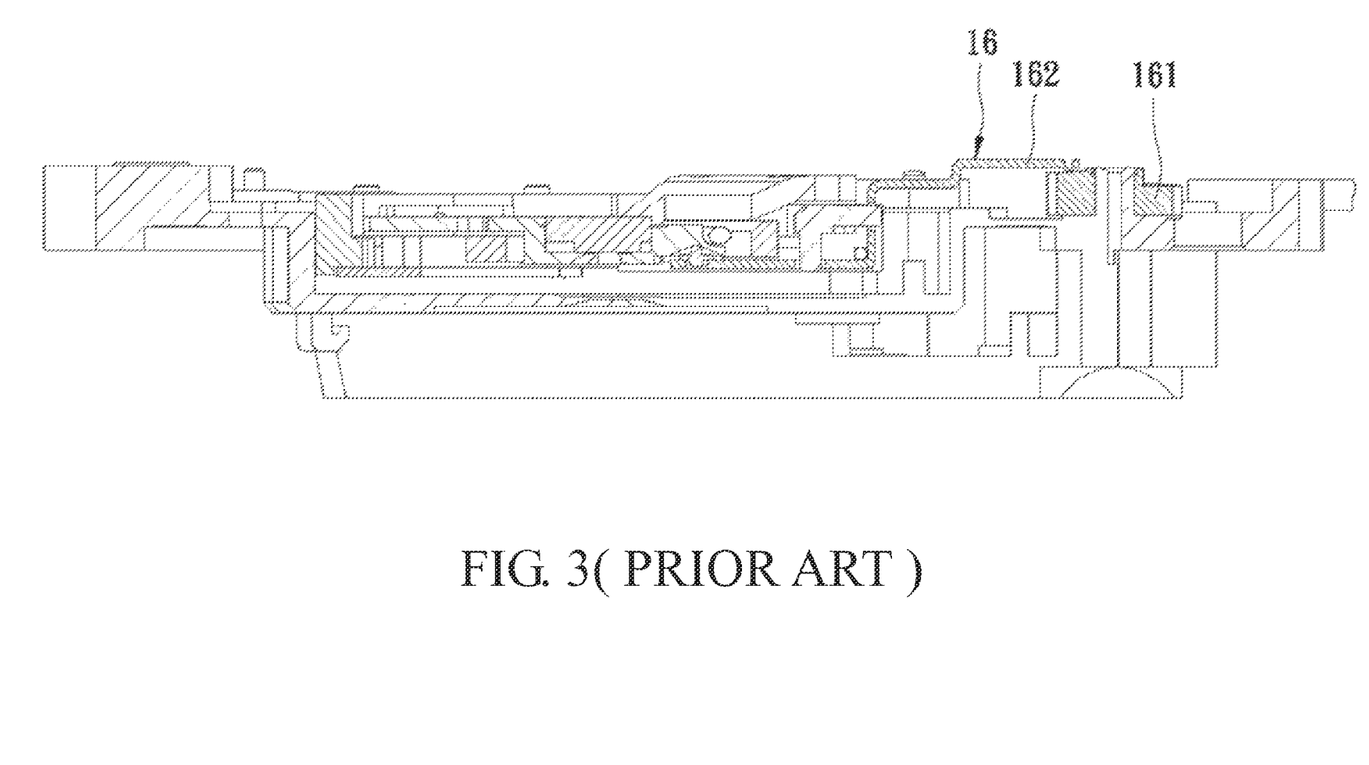
FIG. 3 is a lateral cross-sectional view showing a conventional width of a positioning member.

Referring to FIG. 1 and FIG. 3, the anti-vibration device 1 further comprises a positioning member 16 for the image pickup member 14 to move at high speeds. The positioning member 16 comprises a conductance cam 161 and a positioning plank 162 for fixing the conductance cam 161 and the image pickup member 14.

However, because the positioning member 16 uses the conductance cam 161 to connect the motor and the positioning plank 162, The volume of the positioning member 16 is hindered from being reduced, so that increase volume of the camera with anti-vibration device 1.

Additionally, the pair of vertical driving coils 153 and the pair of horizontal driving coils 154 are layered with lots of layers by copper, thus emitting heat causing the copper to have a differential temperature effect. In other words, electric resistance is increased, causing the pair of vertical driving coils 153 and the pair of horizontal driving coils 154 to inefficiently dissipate heat under high temperatures, causing inefficient movement of the vertical moving plane 13 and the horizontal moving plane 12 when moving opposite to the base 11.

Hence, because the pair of vertical driving coils 153 and pair of horizontal driving coils 154 use conventional copper filament as coils, so that the coil has thickness by itself and the positioning member 16 has the conductance cam 161, further miniaturization of camera devices made thereby, is hindered. Thus, a miniaturized anti-vibration image pickup device 1 is desired.

BRIEF SUMMARY OF THE INVENTION

A detailed description is given in the following embodiments with reference to the accompanying drawings.

A miniaturized anti-vibration image pickup device is provided, comprising a base, a first moving plane, a second moving plane, an image pickup unit, and a driving unit.

The first moving plane is disposed in the fixing base. The first moving plane can move along a first direction and opposite to the fixing base. The second moving plane is disposed in the first moving plane, and moves along a second direction that is perpendicular to the first direction and opposite to the fixing base. The image pickup member is disposed in the second moving plane.

The driving member comprises a first magnet disposed in the fixing base and along the first direction, a second magnet disposed in the fixing base and along the second direction, and a circuit board disposed in the second moving plane. The circuit board comprises a printed first precision coil pattern that corresponds to the first magnet, and a printed second precision coil pattern that corresponds to the second magnet.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

Figure 4:
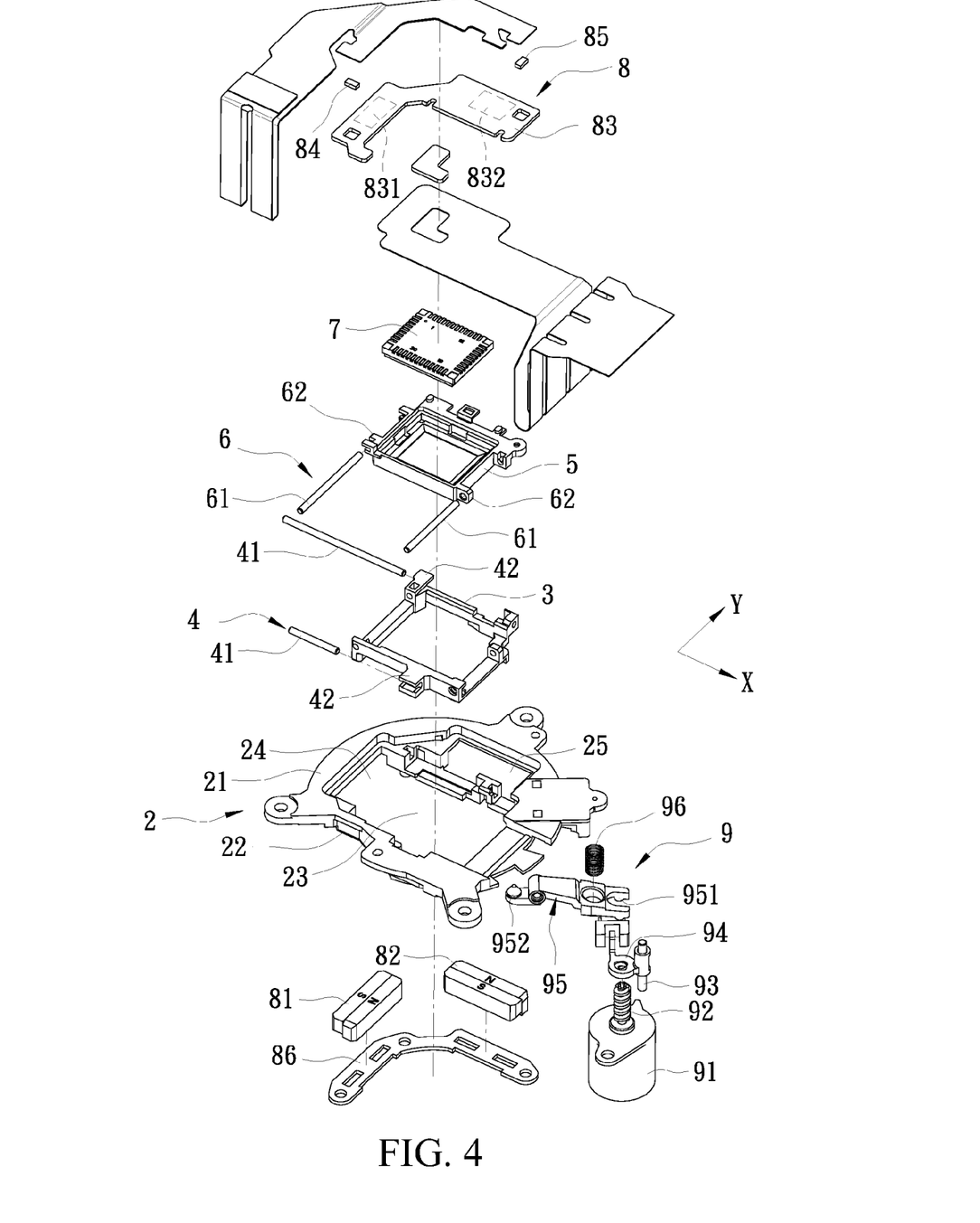
FIG. 4 is an exploded view showing an embodiment of a miniaturized anti-vibration image pickup device of the invention.
Figure 5:
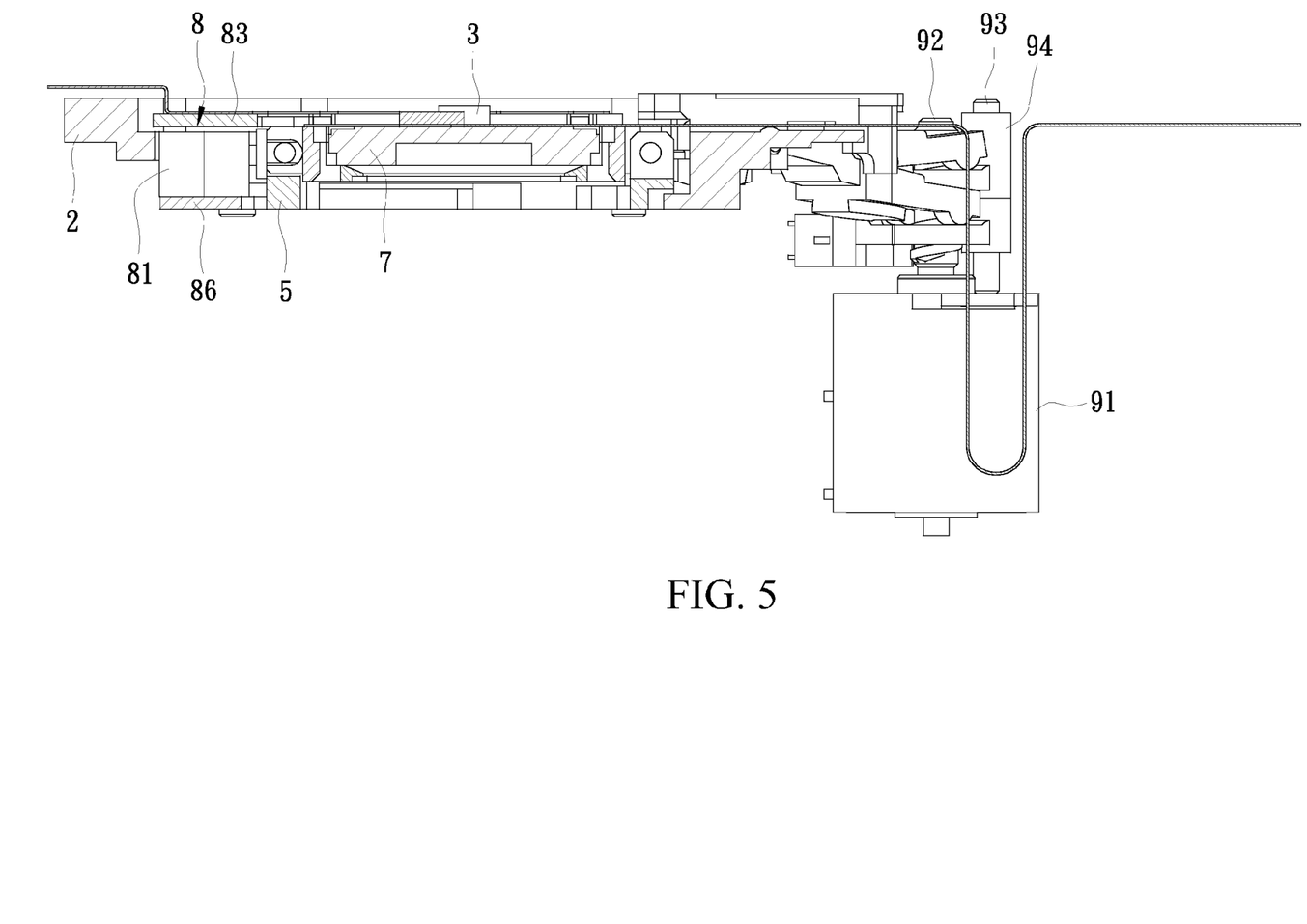
FIG. 5 is a lateral cross-sectional view showing the thickness of a circuit board of an embodiment of the invention.

Referring to FIG. 4 and FIG. 5, a miniaturized anti-vibration image pickup device comprises a fixing base 2, a first moving plane 3, a first guide member 4, a second moving plane 5, a second guide member 6, an image pickup member 7, a driving member 8, and a positioning member 9.

The fixing base 2 comprises a first surface 21, a second surface 22 disposed on the fixing base 2 and opposite to the first surface 21, a hollow area 23 extending from the first surface 21 to the second surface 22, and a first magnet containment area 24 and a second magnet containment area 25 near the hollow area 23.

The first moving plane 3 is disposed on the hollow area 23 of the fixing base 2, and is movable along the first direction X and opposite to the fixing base 2.

The first guide member 4 comprises a pair of first shafts 41 that are disposed on the hollow area of the fixing base 2, and a plurality of first pivots that are disposed on the first plane 3 and relative to the first shaft 41.

The first moving plane 3 use the plurality of first pivots 42 connected to the pair of first shafts 41, specifically, the first guide member 4 can guide the first moving plane 3 along the first direction X and opposite to the fixing base 2.

The second moving plane 5 is disposed on the first moving plane 3, and movable along the second direction Y that is vertical to the first direction X and opposite to the fixing base 2.

The second guide member 6 comprises a pair of second shafts 61 disposed on the first moving plane 3 and along the second direction Y, and a plurality of second pivots 62 disposed on the second moving plane 5 and relative to the second shaft 61.

The plurality of second pivots 62 of the second moving plane 5 are connect to the pair of second shafts 61, so that the second guide member 6 can move along the second direction Y and opposite to the fixing base 2.

The image pickup member 7 is disposed on the second moving plane 5.

The driving member 8 comprises a first magnet 81 and a second magnet 82, both disposed on the fixing base 2, a circuit board 83 disposed on the second moving plane 5, a first hall element 84 and a second hall element 85, and a permeable metal board 86 disposed on the circuit board 83.

The permeable metal board 86, for strengthen the magnetic line of the first magnet 81 and the second magnet 82, and provide the first magnet 81 and second magnet to disposed and plaster on the second surface 22 of the fixing base 2, so that the first magnet 81 disposed on the first containment area 24 that along the first direction X and disposed on fixing base 2, and the second magnet 82 disposed on the second magnet containment area 25 and along the second direction Y.

The circuit board 83 of the miniaturized anti-vibration image pickup device of the invention replaces copper coil used for conventional image pickup devices to decrease thickness of the circuit board by having a first printed precision coil pattern 831 relative to the first magnet 81 and a second printed precision coil pattern 832 relative to the second magnet 82.

Note that the first precision coil pattern 831 and the second precision coil pattern 832 use less copper materials, and less layers than conventional image pickup devices, so that electrical resistances are not effected by heat effect, thus increasing stability of the driving member 8.

The first hall element 84 is disposed on the circuit board 83 and is relative to the first magnet 81, for detecting changes in the magnetic line. The second hall element 85 is disposed on the circuit board 83 and is relative to the second magnet 82.

Figure 6:
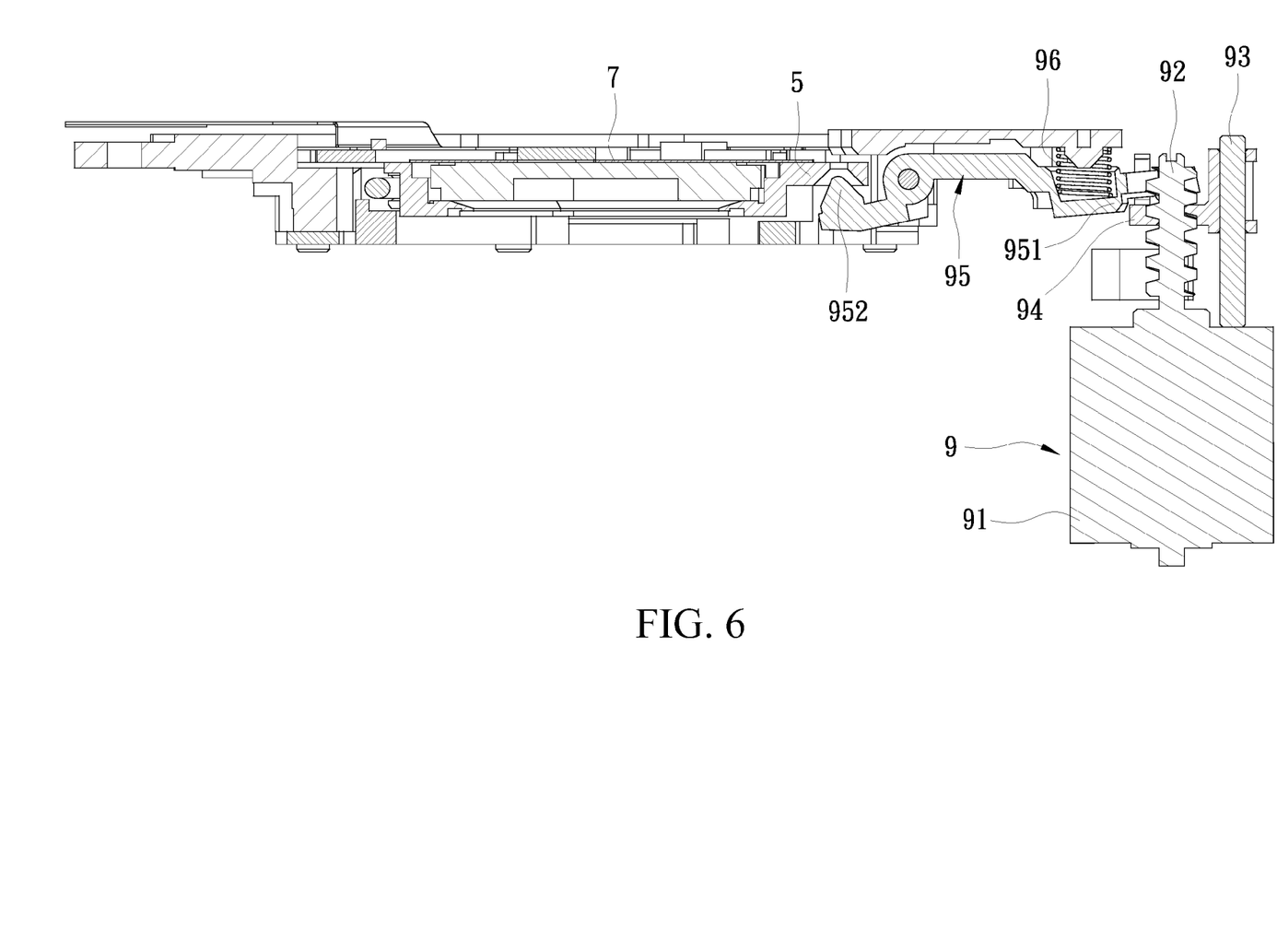
FIG. 6 is a lateral cross-sectional view showing a positioning member at a non-disposed position of an embodiment of the invention.
Figure 7:
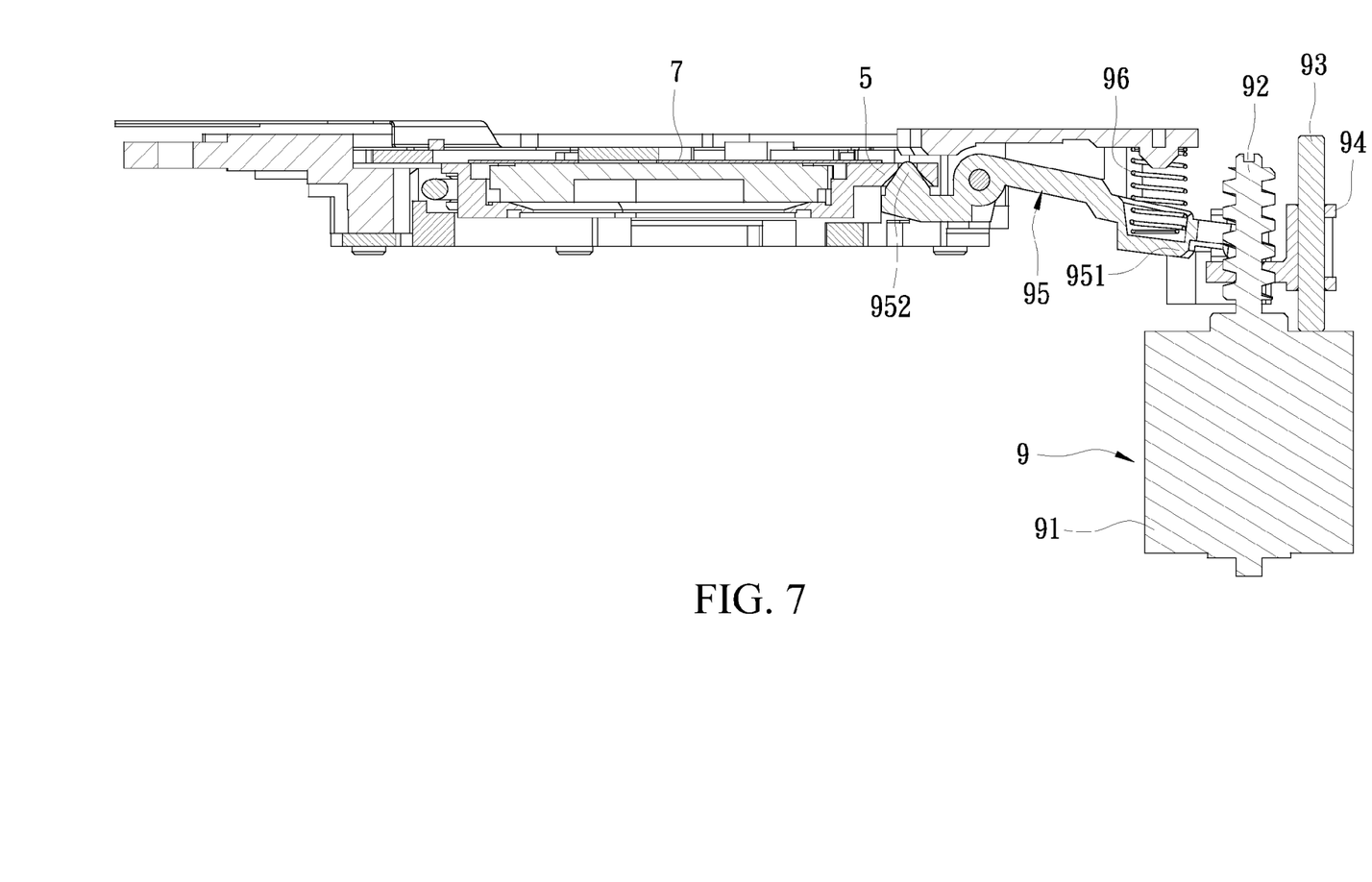
FIG. 7 is a lateral cross-sectional view showing a positioning member at disposed position of an embodiment of the invention.

Referring to FIG. 4, FIG. 6 and FIG. 7, the positioning member 9, releasable and capable of pressing the image pickup member 7, comprises a motor 91, a whorl shaft 92 disposed in the center axle of the motor 91, a shaft 93 parallel to the whorl shaft 92, a guide nut 94 fixing the whorl shaft 92 and the shaft 93, a positioning press board 95 pressing to the guide nut 94 and image pickup member 7, and a spring 96, wherein the positioning press board 95 presses to the image pickup member 7.

The positioning press board 95 has a connecting side 951 that is moved by the guide nut 94 and a pressing side 952 that is pressed to the image pickup member 7, wherein the guide nut 94 is moved straightly by the whorl shaft 92, allowing the positioning press board 95 to move from the disposed position to the non-disposed position and opposite to the fixing base 2.

When the positioning press board 95, is in the disposed position, the pressing side 952 is pressed to the image pickup member 7, and when the positioning press board 95 is in the non-disposed position, the pressing side 952 is released from the image pickup member 7.

For the miniaturized anti-vibration image pickup device of the invention, when in a static position, the first hall element 84 and the second hall element 85 are located near the upper part of the first magnet 81 and the second magnet 82, and the detected change in the magnetic field value is zero.

When a camera is vibrated by a user during operation, the driving member 8 drives the first moving plane 3 and the second moving plane 5 to move along the first direction X, the second direction Y and opposite to the fixing base 2, to push the image pickup member 7 forward to restrain and compensate for blurred images.

The driving member 8 input electronic signal to the first precision coil pattern 831 and the second precision coil pattern 832 of the circuit board 83, so that face to face to move with the first magnet 81 and the second magnet 82, at same time, allowing the first hall element 84 and the second hall element 85 to detect a changed magnetic line, thus, adjusting the electronic signal sent to the circuit board 83.

The invention decreases thickness and volume of the miniaturized anti-vibration image pickup device by using the first precision coil pattern 831 and the second precision coil pattern 832 printed on the circuit board 83 and at same time use the whorl shaft 92 and guide nut 94 can push forward the positioning press board 95 to move.

What is claimed is:

1. A miniaturized anti-vibration image pickup device, comprising:
    a fixing base;
    a first moving plane, disposed on the fixing base, movable along a first direction and opposite to the fixing base;
    a second moving plane, disposed on the first moving plane, movable along a second direction that is vertical to the first direction and opposite to the fixing base;
    an image pickup member, disposed on the second moving plane;
    a driving member, comprises a first magnet disposed on the fixing base and disposed along the first direction, a second magnet disposed on the fixing base and disposed along the second direction, and a circuit board disposed on the second moving plane, wherein the circuit board comprises a first precision coil pattern that is printed and is opposite to the first magnet and a second precision coil pattern that is printed and opposite to the second magnet;
    a positioning member, comprising a motor;
    a whorl shaft, disposed in the center axle of the motor;
    a guide shaft, parallel to the whorl shaft;
    a guide nut, covering the guide shaft and the whorl shaft;
    a positioning press board, fixing the guide nut and the image pickup member; and
    a spring, allowing the positioning press board to press the image pickup member, wherein the positioning press board has a connecting side that is moved by the guide nut and a pressing side that presses the image pickup member, and the guide nut moves straight along the whorl shaft, allowing the positioning press board to move between a disposed position and a non-disposed position and opposite to the fixing base, so that when the positioning press board is in the disposed position the pressing side fixes the image pickup member, and when the positioning press board is in the non-disposed position the pressing side releases the image pickup member.

2. A miniaturized anti-vibration image pickup device as claimed in claim 1, wherein the driving member further comprises a first Hall element disposed on the circuit board and opposite to the first magnet and a second Hall element disposed on the circuit board and opposite to the second magnet.

3. A miniaturized anti-vibration image pickup device as claimed in claim 2, wherein the driving member further comprises a permeable metal board that fixes the first magnet and the second magnet.

4. A miniaturized anti-vibration image pickup device, comprising:
   a fixing base;
   a first moving plane, disposed on the fixing base, movable along a first direction and opposite to the fixing base;
   a second moving plane, disposed on the first moving plane, movable along a second direction that is vertical to the first direction and opposite to the fixing base;
   an image pickup member, disposed on the second moving plane;
   a driving member, comprises a first magnet disposed on the fixing base and disposed along the first direction, a second magnet disposed on the fixing base and disposed along the second direction, and a circuit board disposed on the second moving plane, wherein the circuit board comprises a first precision coil pattern that is printed and is opposite to the first magnet and a second precision coil pattern that is printed and opposite to the second magnet;
   a first guide member; and
   a second guide member, wherein the fixing base comprises a first surface, a second surface opposite to the first surface, and a hollow area extending from the first surface to the second surface, wherein the first guide member comprises a pair of first shafts disposed in the hollow area along the first direction, and a plurality of first pivots disposed on the first moving plane relative to the pair of first shafts, and the second guide member comprises a pair of second shafts disposed on the first moving plane along the second direction, and a plurality of second pivots disposed on the second moving plane relative to the pair of second shafts.

5. A miniaturized anti-vibration image pickup device as claimed in claim 4, wherein the fixing base further comprises a first magnet containment area and a second magnet containment area near to the hollow area for respectively fixing the first magnet and the second magnet of the driving member.

6. A miniaturized anti-vibration image pickup device as claimed in claim 5, wherein the driving member further comprises a permeable metal board disposed on the second surface of the fixing base, fixing the first magnet and the second magnet, respectively, on the first magnet containment area and second contain magnet containment area.

* * * * *